United States Patent
Dacey et al.

[15] 3,673,712
[45] July 4, 1972

[54] EDUCATIONAL DEVICE

[72] Inventors: Paul F. Dacey, Nashua, N.H.; Samuel De Toma, Natick; Thomas F. Hayes, Woburn; Matthew F. McNamara, Cambridge, all of Mass.

[73] Assignee: EDUJ Corporation, Boston, Mass.

[22] Filed: Dec. 21, 1970

[21] Appl. No.: 100,216

[52] U.S. Cl. ..................................35/74, 35/9 E
[51] Int. Cl. ..........................................G09b 1/22
[58] Field of Search ..................35/9 E, 26, 35 F, 74

[56] References Cited

UNITED STATES PATENTS

| | | | |
|---|---|---|---|
| 1,656,030 | 1/1928 | Waring | 35/74 |
| 3,510,961 | 5/1970 | Hawkins | 35/9 E |
| 3,608,206 | 9/1971 | Knott | 35/26 |

FOREIGN PATENTS OR APPLICATIONS

| | | | |
|---|---|---|---|
| 712,342 | 7/1954 | Great Britain | 35/35 F |

Primary Examiner—Harland S. Skogquist
Attorney—Morse, Altman & Oates

[57] ABSTRACT

A rotatable dial, bearing pictures of common objects, is provided with a plurality of individual word cards which may be mounted to the dial by a pupil adjacent an identifying picture. The dial is provided with a word identification of each picture but the word is normally hidden from view being exposed only by a slide window by which the child confirms identification and word association. A transparent overlay is provided by which the child may trace the picture and word to further enhance word association.

8 Claims, 2 Drawing Figures

PATENTED JUL 4 1972 3,673,712

INVENTORS
PAUL F. DACEY
SAMUEL DETOMA
THOMAS F. HAYES
MATTHEW F. McNAMARA

BY Morse, Altman & Oates
ATTORNEYS

EDUCATIONAL DEVICE

BACKGROUND OF THE INVENTION

1. Field of the Invention

This invention relates generally to educational devices and more particularly is directed towards a new and improved self-instructional device for particular use with children in developing word assocation.

2. Description of the Prior Art

One of the most important aims in teaching children, particularly small children in early and pre-school years, is the development of word association wherein a child can identify or understand the meaning of written or printed words. This task is often done by the use of simple books or flash cards in which the word is printed along with a related picture. While this technique does work it normally requires a considerable amount of repetition and is not always successful, particularly with a slow learning child. Also, this type of instruction normally requires close supervision by a teacher so that in a large class teaching tends to be inefficient and the benefits to the pupils may be not uniform.

Accordingly, it is an object of the present invention to provide a new and improved educational device particularly useful for developing word association. A further object of this invention is to provide an educational device for teaching word association wherein the student is directly involved with his own instruction and requiring little or no supervision.

SUMMARY OF THE INVENTION

This invention features an educational device, comprising a relatively fixed board and a rotatable dial associated therewith. The dial is provided with a plurality of angularly spaced intelligent representations such as pictures of common objects with related intelligent information such as identifying words spaced from the pictures. The identifying words normally are covered by the overlying board and move into registration with a slide-covered window which is operated by the child. Individual word cards are provided for placement by the child on the dial adjacent a corresponding picture and a transparent mask is provided on which the child may trace both the picture and the word to enhance the association.

DETAILED DESCRIPTION OF THE PREFERRED EMBODIMENT

Figure 2:
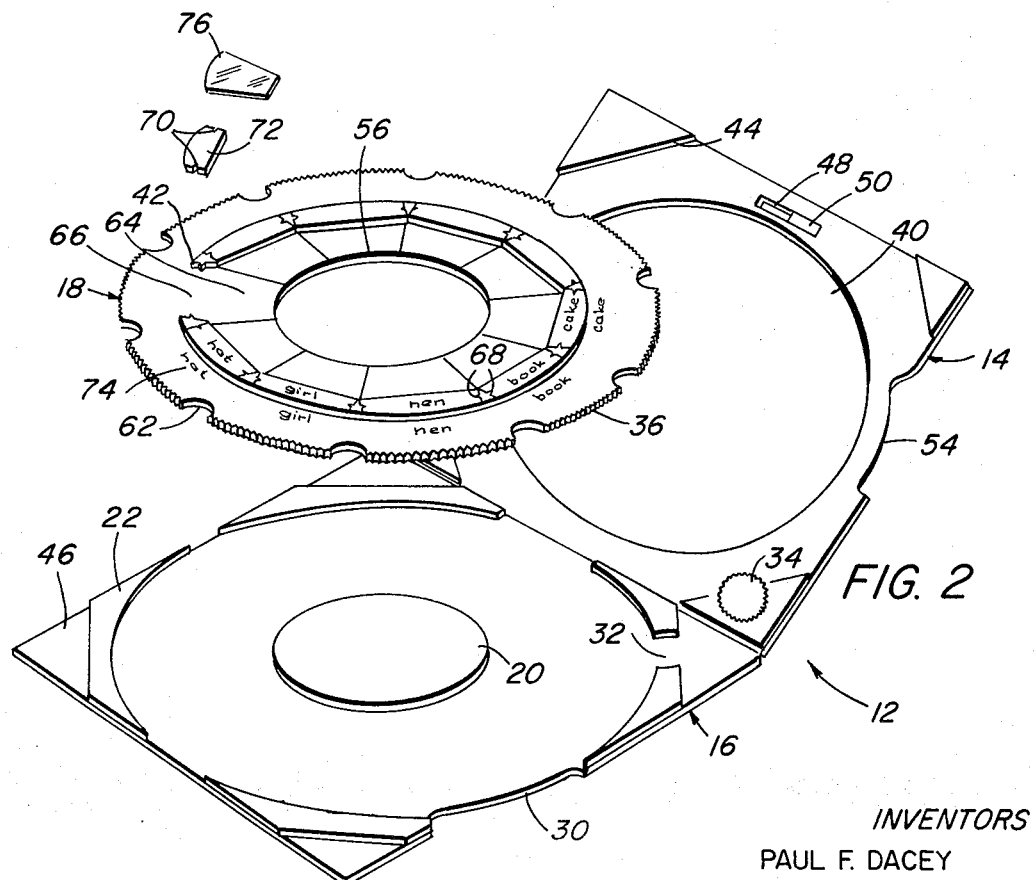

Referring now to the drawings, the reference character 10 generally indicates an educational device organized about a cover 12 comprised of hinged front and rear panels 14 and 16 respectively. Rotatably disposed within the cover 12 is a dial 18 secured by means of a hub 20 fixed to the cover panel 16. The rear panel 16 of the cover 12, as best shown in FIG. 2, is substantially square in outline and is formed with a plurality of shoulder segments 22 defining a shallow annular recess about the hub 20 at the center thereof to locate the dial 18 which is deposited in the recess for rotation about the hub 20.

Figure 1:
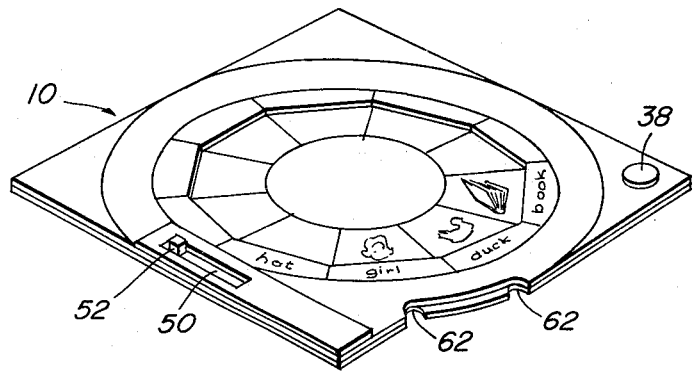
FIG. 1 is a view in perspective of an educational device made according to the invention, and, FIG. 2 is an exploded view in perspective showing the cover in an open position.

The rear panel 16 is cut away at the lower right-hand corner thereof to form an arcuate segment 30 which will expose an arcuate segment of the dial 18 when mounted to the cover. One of the shoulder segments 22 at the upper right-hand corner of the panel 16 is also cut away at 32 to accommodate an optional gear 34 on the front panel 14 to engage cooperating peripheral teeth 36 formed about the dial 18 and serving to actuate a rotary counter 38 appearing at the upper right-hand corner of the device in FIG. 1.

The front panel 14 is formed with an enlarged central circular opening 40 which is smaller in diameter than the maximum diameter of the dial 18 and slightly larger than the diametrical distance of circularly arrayed positioning lugs 42 evenly and angularly spaced about the upper face of the dial 18. The inner face of the front panel 14 is formed with triangular corner lands 44 which fit in cooperating triangular recesses 46 in opposing corners of the rear panel 16 to form a strong, flat board assembly without internal voids. The front panel 14 is also provided with an aperture 48 which may be opened or closed by means of a slide 50 for reasons that will presently appear. The slide 50 is provided with a knob 52 on the outer face thereof for easy operation. The panel 14 will also be seen to be formed with a cutaway section 54 matching that of the cutaway section 30 in the rear panel to expose the edge of the dial 18 when the cover is closed.

The dial 18 is generally in the form of a flat circular disc formed with a center circular opening 56 dimensioned to fit over the hub 20. Notches 62 are formed about the peripheral edge of the dial and serve as gripping means by which a child may easily turn the dial within the cover. It will be noted in FIG. 1 that the cutaway portions on the cover 30 and 54 are sufficiently large to accommodate an angular spacing on the dial encompassed by two adjacent notches 62 by which the student may manipulate the dial in the manner to be described below.

The dial upper face carries a plurality of pictures 64 arrayed in a circular pattern outwards of the raised hub 20 and within the circle defined by the lugs 42. Each picture 64 is of a different common subject which will be easily recognized by a child and below each picture is a blank space 66 extending between each pair of lugs 42. The lugs preferably are formed with projecting teeth 68 on opposite sides thereof to lock with cooperating notches 70 formed at each end of a word card 72 dimensioned to fit over the space 66 between a pair of adjacent lugs 42. Each dial is provided with a set of word cards which correspond with a set of pictures on the dial. Outwardly spaced from each picture 64 near the periphery of the dial is a printed word 74 identifying the object in that particular picture. The words 74 normally are covered from view by the front panel 14 and may be viewed only by opening the slide 50 when a word is in registration with the aperture 48.

A transparent overlay mask 76 of smooth, stiff material, such as celluloid or the like, is provided for purposes to be set forth below.

The device is used by first selecting a dial 18, placing it within the cover setting it down over hub 20 in the shallow recess of the rear panel and closing the front panel. Word cards 72 are then placed in two columns on top of the face of the hub 20 and the first picture is rotated to the bottom of the board directly opposite the aperture 48 which initially is closed. At this point, only the picture is visible and there are no identifying words. The child then looks at the picture and selects a word card which he believes to identify that particular picture. He then places the word card on the space 66 directly below the picture locking it between the lugs 42. Having done this, the child then opens the slide 50 to disclose the correct word that goes with the corresponding picture. Assuming the child has selected the correct card, the word on the card will correspond with the word appearing in the aperture. If the words do not correspond, the child will see immediately that he has selected the wrong word card and will select another one. Once the child has selected the correct word card, he places the transparent mask 76 over both the picture and the word card and traces the picture and the word, using a suitable marker such as a crayon or a felt-tip pen which, while leaving a clear marking, may be wiped clean easily for use with the next picture. Having done this, the child then rotates the dial, using the exposed edge, and brings the next picture into position. He again selects a card and confirms the selection by opening the slide. The procedure is repeated until all of the cards are selected and properly placed on the dial. The use of the numbered counter 38 provides additional educational activity for the child since he can observe the relationship of counting with respect to movement of the dial.

The device may be used with several sets of dials all showing different sets of pictures and each dial will be accompanied by a different set of corresponding word cards associated therewith. In addition to vocabulary instruction the device may be used for various other teaching purposes for other subjects. The cover and dial may be fabricated from heavy cardboard, wood, plastic or any other suitable material and may be made in a variety of sizes with the illustrated embodiment typically being on the order of about 16 or 17 inches square.

Having thus described the invention, what we claim and desire to obtain by Letters Patent of the United States is:

1. An educational device, comprising
   a. front and rear panels connected to one another,
   b. said front panel being formed with a circular opening therein and an aperture adjacent said opening,
   c. a slide mounted to said front panel for opening and closing said aperture,
   d. a circular dial mountable between said panels in register with said opening,
   e. said dial bearing first intelligent representations arrayed in a circular pattern and visible through said circular opening,
   f. said dial also bearing related second intelligent representations arrayed in a concentric annular pattern and visible only through said aperture,
   g. a plurality of cards associated with said dial and bearing related second intelligent representations, and,
   h. positioning means on said dial for mounting selected cards on said dial adjacent said first intelligent representations.

2. An educational device according to claim 1 including a transparent mask positionable over said first intelligent representation and a card adjacent thereto.

3. An educational device according to claim 1 wherein at least a portion of the outer edge of said dial is exposed.

4. An educational device according to claim 1 including a rotary counter mounted to said front panel and drivingly connected to said dial.

5. An educational device according to claim 1 including a hub fixed to said rear panel for positioning said dial thereabout.

6. An educational device according to claim 1 wherein said rear panel is formed with a shallow annular recess to receive said dial.

7. An educational device according to claim 1 wherein said positioning means includes spaced lugs formed with opposing teeth and said cards are formed with cooperating notches to receive said teeth.

8. An educational device according to claim 1 wherein said first representations are pictures and said second representations are words.

* * * * *